(12) United States Patent
Kendricks (10) Patent No.: US 9,915,366 B2
(45) Date of Patent: Mar. 13, 2018

(54) THREADED ADAPTER ASSEMBLY AND FUSE PLUG (71) Applicant: GOODRICH CORPORATION, Charlotte, NC (US)

(72) Inventor: Warren Kendricks, Dayton, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 94 days.

(21) Appl. No.: 14/801,327

(22) Filed: Jul. 16, 2015

(65) Prior Publication Data
US 2017/0016547 A1   Jan. 19, 2017

(51) Int. Cl.
*F16K 17/40*   (2006.01)
*F16K 17/38*   (2006.01)
*B64C 25/36*   (2006.01)
*B60T 17/04*   (2006.01)

(52) U.S. Cl.
CPC .......... *F16K 17/383* (2013.01); *B60T 17/043* (2013.01); *B64C 25/36* (2013.01); *F16K 17/40* (2013.01)

(58) Field of Classification Search
CPC ..... B60R 21/272; B60R 21/274; F16K 17/40; F16K 17/383
USPC ................... 137/74, 528; 220/89.4
See application file for complete search history.

(56) References Cited

U.S. PATENT DOCUMENTS

| | | | | |
|---|---|---|---|---|
| 1,869,719 A | * | 8/1932 | Southworth | F24F 6/06 261/24 |
| 1,922,625 A | * | 8/1933 | Lovekin | F22B 37/475 116/216 |
| 3,927,791 A | * | 12/1975 | Hershberger | F22B 37/46 102/481 |
| 4,628,953 A | * | 12/1986 | Correll | B64C 25/36 137/74 |
| 6,681,796 B2 | * | 1/2004 | King, Jr. | F16L 41/065 137/107 |
| 2009/0255042 A1 | * | 10/2009 | Htay | E03D 1/306 4/378 |

FOREIGN PATENT DOCUMENTS

| | | |
|---|---|---|
| EP | 0191717 | 8/1986 |
| WO | 2009110017 | 9/2009 |
| WO | 2010006838 | 1/2010 |
| WO | 2010082222 | 7/2010 |

OTHER PUBLICATIONS

Extended European Search Report dated Jan. 3, 2017 in European Application No. 16179959.8.

* cited by examiner

*Primary Examiner* — Craig Schneider
*Assistant Examiner* — P. Macade Nichols
(74) *Attorney, Agent, or Firm* — Snell & Wilmer L.L.P.

(57) ABSTRACT

A plug system is provided. The plug system may comprise an adapter having an annular body oriented about an axis, a passage defined by the annular body, and a retention feature protruding radially from the annular body. The retention feature may be configured to obstruct the passage. A threaded surface may at least partially define an outer diameter of the annular body. A fuse plug may be configured for insertion into the passage, and the retention feature may be configured to at least partially retain the fuse plug.

17 Claims, 7 Drawing Sheets

THREADED ADAPTER ASSEMBLY AND FUSE PLUG

FIELD

The present disclosure relates to plugs for pressurized systems, and, more specifically, to a threaded adapter and fuse plug for a pressurized system.

BACKGROUND

Aircraft accelerate and decelerate quickly on land, relying heavily on wheel braking systems. During a rejected takeoff (RTO) or a landing, the braking systems may be subject to extreme heat. Hard braking applied on shorter runways may augment the heat increase of the braking system. The heat in the brake systems may result in a significant increase in tire temperature and pressure. Extreme increases in temperature and pressure may tend to liberate tires from wheels.

Plugs and valves in the wheels may be used to vent pressure as wheels and tires are exposed to temperature and pressure increases. However, after heat cycling combined with rolling stresses on the wheels, the plugs and valves may not seal air as well as when they were first installed. During landing and RTO events the increased pressure in the tires may cause air to evacuate the tires at a relatively high rate. Thus, the plugs and valves used in wheel systems may tend to increase tire-pressure maintenance.

SUMMARY

According to various embodiments, an adapter may comprise an annular body oriented about an axis with a passage through the annular body. The passage may be defined by an inner guide having a first conical geometry, an inner wall comprising a cylindrical geometry and extending axially from the inner guide, and a retention feature protruding radially from the inner wall. An outer guide may be disposed radially outward from the inner guide and have a second conical geometry. A threaded surface may extend axially from the outer guide and at least partially defining an outer diameter of the annular body.

In various embodiments, a wrenching feature may at least partially define the outer diameter of the annular body. The annular body may comprise a copper-zinc alloy. The retention feature may define a cylindrical opening. A diameter of the cylindrical opening may be smaller than a diameter of the inner wall. The adapter may be configured to retain a fuse plug within the passage.

According to various embodiments, a plug system may comprise an adapter. The adapter may comprise an annular body oriented about an axis, a passage defined by the annular body, and a retention feature protruding radially from the annular body. The retention feature may be configured to obstruct the passage. A threaded surface may at least partially define an outer diameter of the annular body. A fuse plug may be configured for insertion into the passage, and the retention feature may be configured to at least partially retain the fuse plug.

In various embodiments, the fuse plug comprises an annulus with a ring seal disposed about the annulus, the ring seal configured to sealably engage the annular body. The annulus may comprise aluminum. A fusible material may be disposed within the annulus. The adapter may comprise a copper-zinc alloy.

According to various embodiments, a plug system may comprise an adapter. The adapter may further comprise an annular body oriented about an axis and a passage through the annular body. The passage may be defined by an inner guide having a first conical geometry, an inner wall comprising a cylindrical geometry and extending axially from the inner guide, and a retention feature protruding radially from the inner wall. An outer guide may be disposed radially outward from the inner guide with a second conical geometry. A threaded surface may extend axially from the outer guide and at least partially define an outer diameter of the annular body. A fuse plug may be configured to slideably engage the inner wall.

In various embodiments, a wrenching feature may at least partially define the outer diameter of the annular body. The annular body may comprise a copper-zinc alloy. The retention feature may define a cylindrical opening. A diameter of the cylindrical opening may be smaller than a diameter of the inner wall. The adapter may be configured to retain the fuse plug within the passage. The fuse plug may comprise an annulus with a ring seal disposed about the annulus with the ring seal configured to sealably engage the inner wall. The annulus of the fuse plug may also comprise aluminum. A fusible material may be disposed within the annulus.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

Fuse plugs may be used to seal an opening in a wheel to allow venting of tire pressure during RTO and/or landing events. The fuse plugs may comprise a fusible material inside of an annular, rigid body. The fusible material (e.g., a eutectic alloy) may melt in response to the elevated temperature and pressure within the tire. The fusible material may then liberate from the rigid body allowing air to vent from the tire. The rigid body may be retained in the wheel or ejected. Fusible plugs of the present disclosure may be retained within adapters or directly in wheels. The fusible plugs may also enable increased venting air flow and improve air retention absent the elevated temperatures of RTO and landing events.

Figure 1:
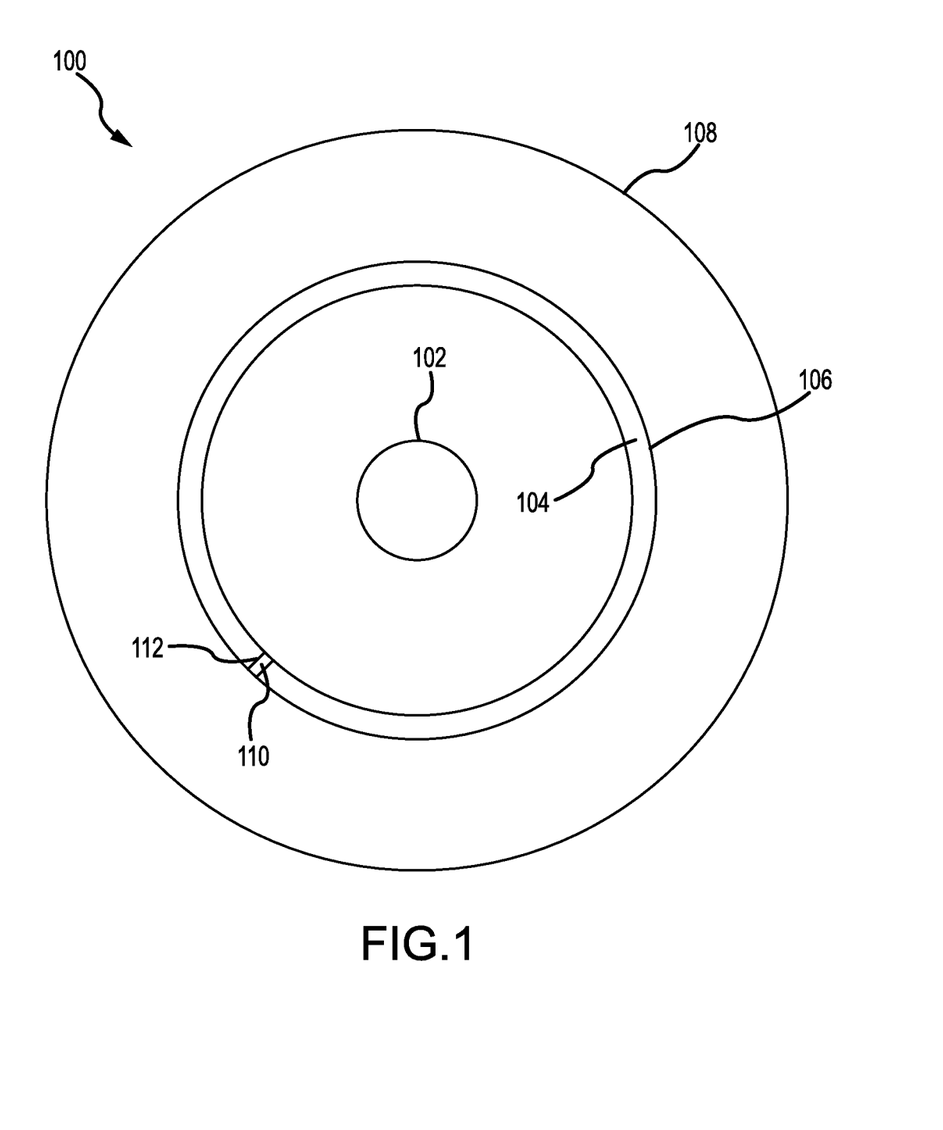
FIG. 1 illustrates an exemplary wheel and tire system including a fuse plug to seal a pressurized compartment, in accordance with various embodiments.

With reference to FIG. 1, an exemplary wheel and tire system 100 is shown, in accordance with various embodiments. Wheel 104 may comprise a hub 102 centrally located and wall 106 configured to interface with tire 108. A chamber may thus be formed between wall 106 of wheel 104 and tire 108. Aperture 112 may be formed through wall 106 of wheel 104. Aperture 112 may fluidly connect the chamber between tire 108 and wall 106 to the surrounding atmosphere. Fuse plug 110 may be lodged in aperture 112 to seal the chamber between tire 108 and wall 106. Fuse plug 110 may partially or completely eject from aperture 112 in response to elevated temperatures combined with air pressure directed radially inward towards hub 102.

Figure 2:
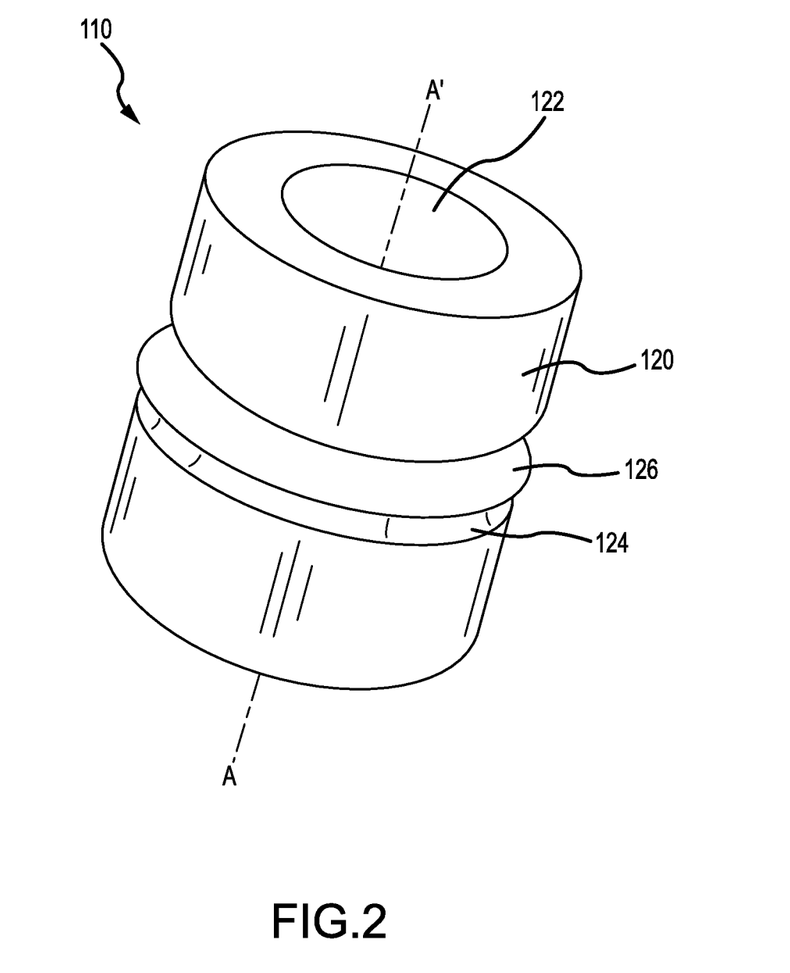
FIG. 2 illustrates a fuse plug having a fusible portion within a rigid body and a ring seal, in accordance with various embodiments.
Figure 3:
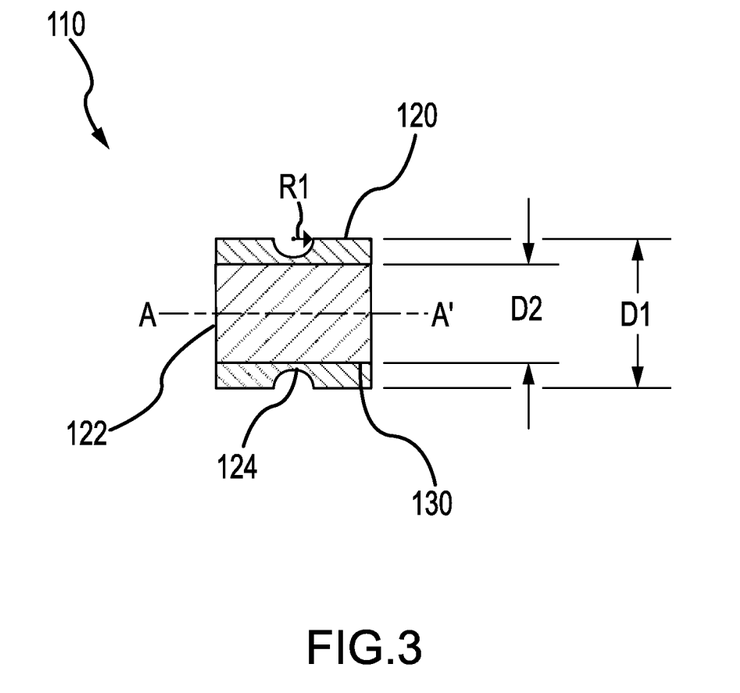
FIG. 3 illustrates a cross-sectional view of a fuse plug having a fusible material retained within a body.

With reference to FIGS. 2 and 3, fuse plug 110 is shown, in accordance with various embodiments. Fuse plug 110 may have an annulus 120, also referred to herein as an annular body. Annulus 120 may be formed from a metallic material such as an aluminum alloy. The metallic material may be selected for favorable corrosion properties with fusible material 122.

In various embodiments, annulus 120 may retain a fusible material 122, also referred to herein as a eutectic alloy, in a central cavity defined by cylindrical inner surface 130 of annulus 120. Fusible material 122 may comprise a tin alloy selected for favorable corrosion characteristics with annulus 120. Annulus 120 may have groove 124 formed about an outer diameter of annulus 120. Ring seal 126 may rest in groove 124 to provide sealing between annulus 120 and aperture 112 of FIG. 1. Ring seal 126 may comprise a silicone or rubber material having flexible properties allowing ring seal 126 to expand and pass around annulus 120 and contract to settle in groove 124. Groove 124 may retain ring seal 126 in place about annulus 120.

In various embodiments, fuse plug 110 may be axially symmetric about axis A-A'. Annulus 120 may have an outer diameter D1 and an inner diameter D2. Fusible material 122 may be bonded to annulus 120 along cylindrical inner surface 130. Groove 124 may be a radial groove having radius R1.

Figure 4A:
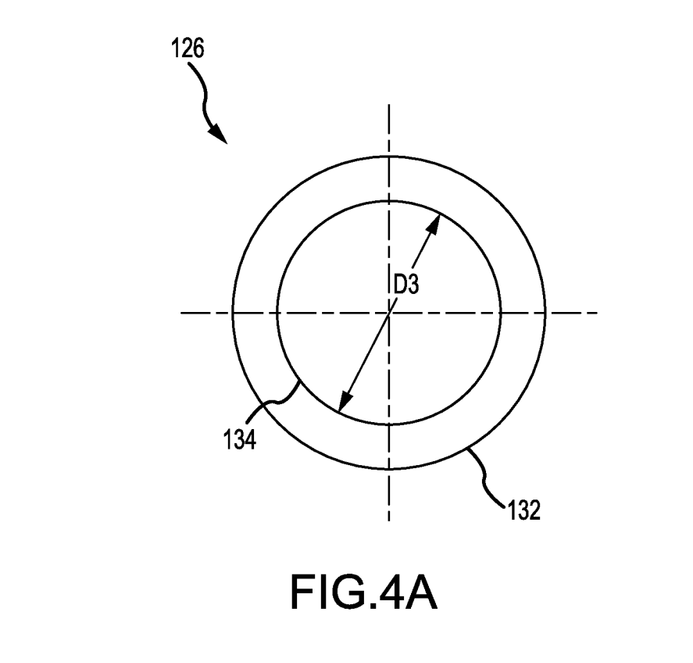
FIG. 4A illustrates a seal ring for use with a fuse plug, in accordance with various embodiments.
Figure 4B:
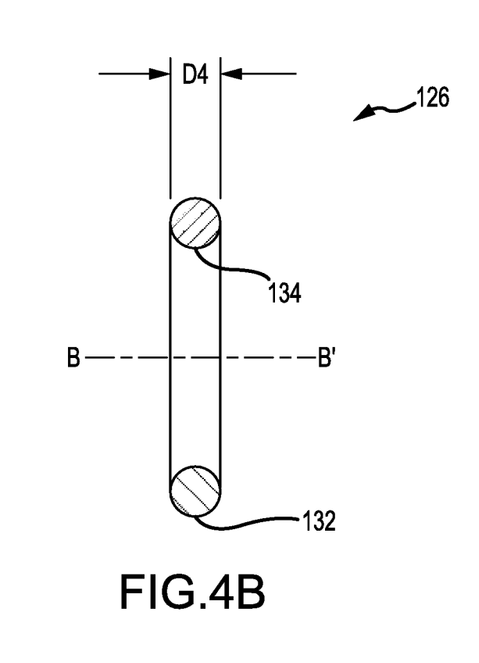
FIG. 4B illustrates a cross-sectional view of a seal ring for use with a fuse plug, in accordance with various embodiments.

With reference to FIGS. 4A and 4B, ring seal 126 is shown, in accordance with various embodiments. Ring seal 126 may be an annular ring having a circular cross section. Ring seal 126 may have a diameter D3 that is less than outer diameter D1 so that ring seal 126 settles in groove 124. Ring seal 126 may have an inner diameter 134 and outer diameter 132 with inner diameter 134 having the diameter D3. Ring seal 126 may be axially symmetric about axis B-B'. Ring seal 126 may have an axial diameter D4.

Figure 5:
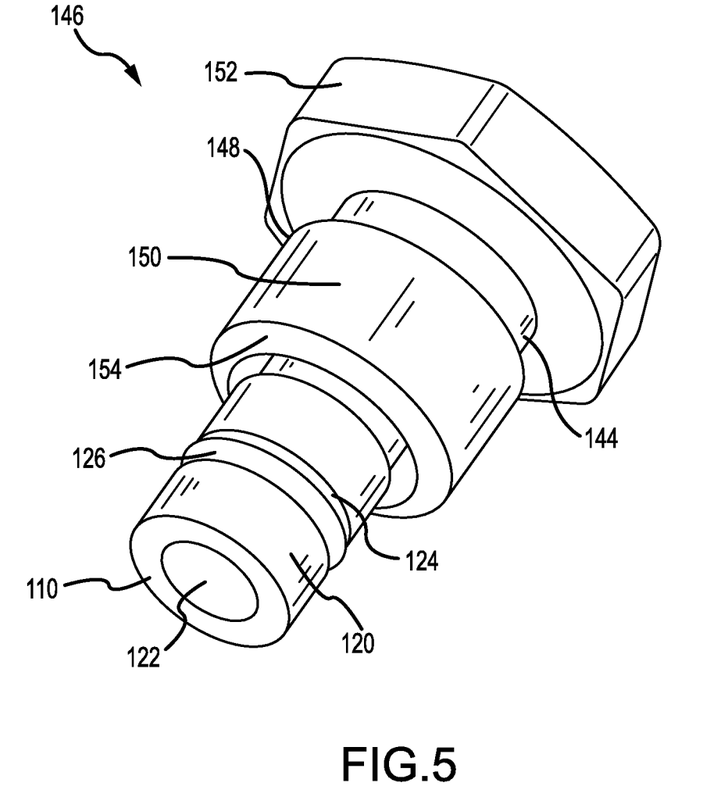
FIG. 5 illustrates a perspective view of a threaded adapter having an opening to receive a fuse plug, in accordance with various embodiments.
Figure 6:
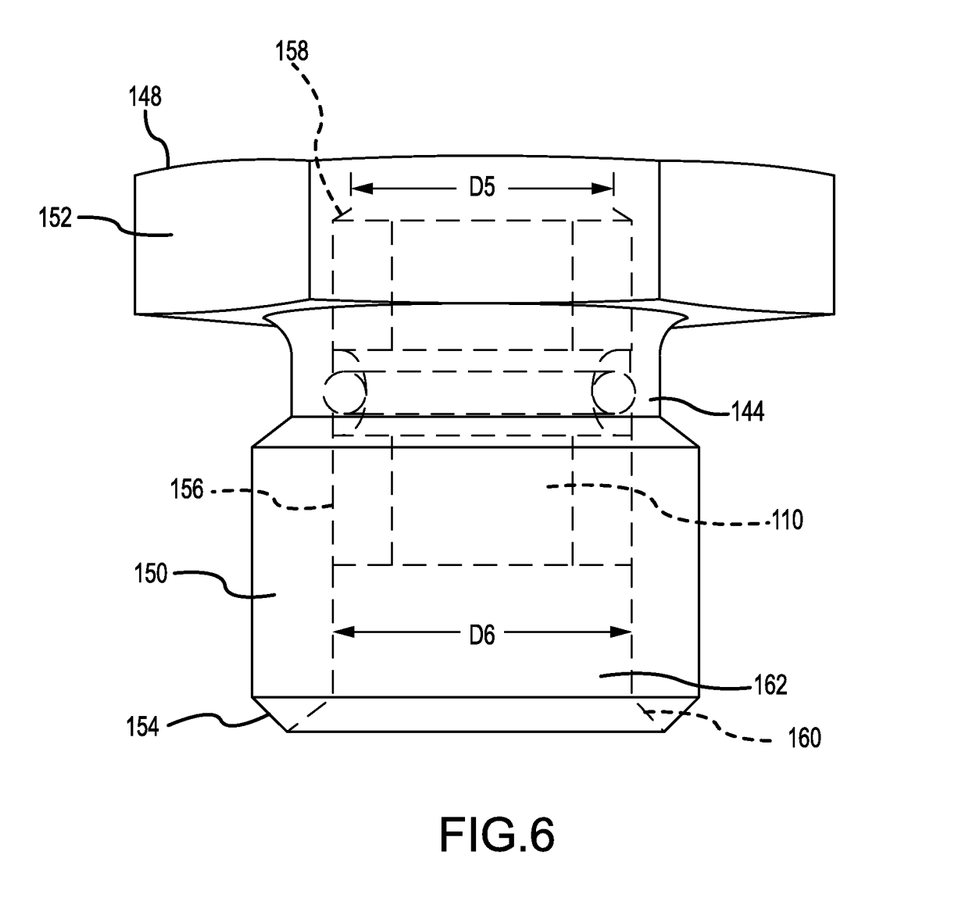
FIG. 6 illustrates an adapter having a seal plug retained within an internal cavity of the threaded adapter, in accordance with various embodiments.

With reference to FIGS. 5 and 6, seal system 146 is shown with adapter 148 engaging fuse plug 110. Adapter 148 may comprise an annular body 144 centered about an axis and coaxial to fuse plug 110 with a wrenching feature 152 disposed at an axial end of the annular body. Wrenching feature 152 may have a hexagonal or polygonal interface for rotating adapter 148 using tools such as wrenches and ratchets. Adapter 148 may also comprise a threaded surface 150 and an outer guide surface 154 having a conical geometry. Outer guide surface 154 may be disposed radially outward from inner guide surface 160. Inner guide surface 160 may comprise a conical geometry configured to guide fuse plug 110 into passage 162. Passage 162 may extend through annular body 144 of adapter 148 in an axial direction. Inner guide surface 160 may partially define passage 162.

In various embodiments, an inner wall 156 may have a cylindrical geometry and extend axially from inner guide surface 160 to partially define passage 162. A retention feature 158 may protrude radially from the inner wall 156 to obstruct passage 162 and at least partially retain fuse plug 110 within passage 162. Outer guide surface 154 may be disposed radially outward from the inner guide surface 160 with a threaded surface 150 extending axially from outer guide surface 154 and at least partially defining an outer diameter of annular body 144.

Figure 7:
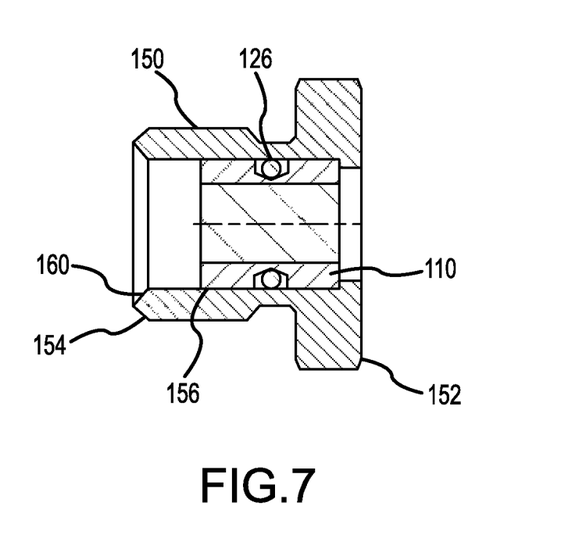
FIG. 7 illustrates a cross-sectional view of an adapter having a fuse plug retained within an internal cavity, in accordance with various embodiments.

In various embodiments, and with reference to FIGS. 6 and 7, annular body 144 may comprise a copper-zinc alloy (i.e., brass) or another material with favorable softness and malleability. Inner wall 156 may engage fuse plug 110 and sealably engage ring seal 126. Retention feature 158 may define a cylindrical opening having diameter D5. Diameter D5 of the cylindrical opening may be smaller than diameter D6 of inner wall 156.

Fuse plug 110 may press against retention feature 158 and obstruct passage 162 to prevent gas from flowing through passage 162. Fuse plug 110 may be smaller than passage 162 with space available between fuse plug 110 and inner wall 156 for gas to pass through. Ring seal 126 may sealably engage inner wall 156 in a manner that deforms ring seal 126 and limits or prevents gas from passing through passage 162 between fuse plug 110 and inner wall 156.

With reference to FIGS. 3 and 7, as air adjacent fuse plug 110 heats, the fusible material 122 of fuse plug 110 may melt and axially eject from annulus 120 past retention feature 158. Annulus 120 may be retained in adapter 148 with an opening for air to pass through where fusible material 122 was previously located. In that regard, fuse plug 110 and adapter 148 may enable evacuation of high pressure air in response to RTO or landing events. Furthermore, fuse plug 110 with an annulus 120 may improve durability across heat cycles and rolling wheel stresses and improve the joint between fusible material 122 and annulus 120 to air leakage.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An adapter, comprising:
   an annular body oriented about an axis;
   a passage through the annular body, the passage defined by:
      an inner guide having a first conical geometry,
      an inner wall comprising a cylindrical geometry and extending axially from the inner guide, and
      a retention feature formed integrally with the inner wall and protruding radially from the inner wall, wherein the retention feature defines a terminus of the inner wall and obstructs the passage, wherein the retention feature defines a cylindrical opening and wherein a diameter of the cylindrical opening is smaller than a diameter of the inner wall; and
   an outer guide disposed radially outward from the inner guide and having a second conical geometry.

2. The adapter of claim 1, further comprising a threaded surface extending axially from the outer guide and at least partially defining an outer diameter of the annular body.

3. The adapter of claim 1, wherein the annular body comprises a copper-zinc alloy.

4. The adapter of claim 1, wherein the adapter is configured to retain a fuse plug within the passage.

5. A plug system, comprising:
   an adapter, comprising:
      an annular body oriented about an axis;
      a passage defined by the annular body;
      a retention feature protruding radially inward from the annular body, the retention feature defining a terminus of the passage and configured to obstruct the passage;
      a threaded surface at least partially defining an outer diameter of the annular body; and
   a fuse plug configured for insertion into the passage, wherein the retention feature is configured to at least partially retain the fuse plug within the passage and wherein the fuse plug comprises an annulus with a ring seal disposed about the annulus, the ring seal configured to sealably engage the annular body.

6. The plug system of claim 5, wherein the annulus comprises aluminum.

7. The plug system of claim 6, further comprising a fusible material disposed within the annulus.

8. The plug system of claim 6, wherein the adapter comprises a copper-zinc alloy.

9. A plug system, comprising:
   an adapter, comprising:
      an annular body oriented about an axis;
      a passage through the annular body, the passage defined by:
         an inner guide having a first conical geometry,
         an inner wall comprising a cylindrical geometry and extending axially from the inner guide, and
         a retention feature protruding radially inward from the inner wall and defining a terminus of the inner wall;
      an outer guide disposed radially outward from the inner guide and having a second conical geometry;
      a threaded surface extending axially from the outer guide and at least partially defining an outer diameter of the annular body; and
   a fuse plug configured to slideably engage the inner wall.

10. The plug system of claim 9, further comprising a wrenching feature at least partially defining the outer diameter of the annular body.

11. The plug system of claim 9, wherein the annular body comprises a copper-zinc alloy.

12. The plug system of claim 9, wherein the retention feature defines a cylindrical opening.

13. The plug system of claim 12, wherein a diameter of the cylindrical opening is smaller than a diameter of the inner wall.

14. The plug system of claim 9, wherein the adapter is configured to retain the fuse plug within the passage.

15. The plug system of claim 9, wherein the fuse plug comprises an annulus with a ring seal disposed about the annulus, the ring seal configured to sealably engage the inner wall.

16. The plug system of claim 15, wherein the annulus of the fuse plug comprises aluminum.

17. The plug system of claim 16, further comprising a fusible material disposed within the annulus.

\* \* \* \* \*